United States Patent [19]

Challberg et al.

[11] Patent Number: 5,283,809
[45] Date of Patent: Feb. 1, 1994

[54] STEAM SEPARATOR LATCH ASSEMBLY

[75] Inventors: Roy C. Challberg, Livermore; Irvin R. Kobsa, San Jose, both of Calif.

[73] Assignee: General Electric Company, San Jose, Calif.

[21] Appl. No.: 55,478

[22] Filed: May 3, 1993

[51] Int. Cl.⁵ .............................................. G21C 15/16
[52] U.S. Cl. .................... 376/260; 376/371; 376/463
[58] Field of Search ............... 376/260, 371, 463, 370; 976/DIG. 195; 220/324, 325, 315

[56] References Cited

U.S. PATENT DOCUMENTS

| | | | |
|---|---|---|---|
| 4,238,291 | 12/1980 | Neuenfeldt et al. | 376/463 |
| 5,162,097 | 11/1992 | Fennern | 376/370 |
| 5,213,756 | 5/1993 | Fennern | 376/370 |

Primary Examiner—Daniel D. Wasil
Attorney, Agent, or Firm—J. S. Beulick

[57] ABSTRACT

A latch assembly removably joins a steam separator assembly to a support flange disposed at a top end of a tubular shroud in a nuclear reactor pressure vessel. The assembly includes an annular head having a central portion for supporting the steam separator assembly thereon, and an annular head flange extending around a perimeter thereof for supporting the head to the support flange. A plurality of latches are circumferentially spaced apart around the head flange with each latch having a top end, a latch hook at a bottom end thereof, and a pivot support disposed at an intermediate portion therebetween and pivotally joined to the head flange. The latches are pivoted about the pivot supports for selectively engaging and disengaging the latch hooks with the support flange for fixedly joining the head to the shroud or for allowing removal thereof.

16 Claims, 6 Drawing Sheets

STEAM SEPARATOR LATCH ASSEMBLY

The U.S. Government has rights in this invention in accordance with Contract No. DE-ACO3-90SF18494 awarded by the Department of Energy.

The present invention relates generally to nuclear reactors, and, more specifically, to a fastening arrangement for joining a steam separator assembly inside a reactor pressure vessel.

BACKGROUND OF THE INVENTION

In a conventional boiling water reactor, a nuclear reactor core is submerged in water inside an annular pressure vessel. An annular shroud or chimney extends upwardly from the reactor core for receiving therefrom a water-steam mixture which is channeled therein to a conventional steam separator assembly which separates the steam and water in a conventionally known manner. The steam separator assembly includes a plurality of conventional tubular steam separators each extending upwardly from a tubular standpipe, with the several standpipes extending upwardly from an annular head in the form of either a flat or dome plate disposed on the shroud or chimney. The standpipes are disposed in flow communication with respective holes through the head for receiving the water-steam mixture which is channeled upwardly into each of the steam separators.

The steam separator assembly is conventionally fixedly joined to the shroud by a plurality of circumferentially spaced apart bolts extending through an integral flange extending around the outer periphery of the head and into a mating support flange disposed at the top end of the shroud. In order to assemble or remove the steam separator assembly, each of the many bolts must be individually assembled and torqued or untorqued and disassembled from the head which requires a considerable amount of time. Since this operation is usually conducted manually with an operator positioned at the top of the pressure vessel, the operation is relatively complex and subjects the operator to radiation dosage from the reactor core.

SUMMARY OF THE INVENTION

A latch assembly removably joins a steam separator assembly to a support flange disposed at a top end of a tubular shroud in a nuclear reactor pressure vessel. The assembly includes an annular head having a central portion for supporting the steam separator assembly thereon, and an annular head flange extending around a perimeter thereof for supporting the head to the support flange. A plurality of latches are circumferentially spaced apart around the head flange with each latch having a top end, a latch hook at a bottom end thereof, and a pivot support disposed at an intermediate portion therebetween and pivotally joined to the head flange. The latches are pivoted about the pivot supports for selectively engaging and disengaging the latch hooks with the support flange for fixedly joining the head to the shroud or for allowing removal thereof.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENTS(S)

Figure 1:
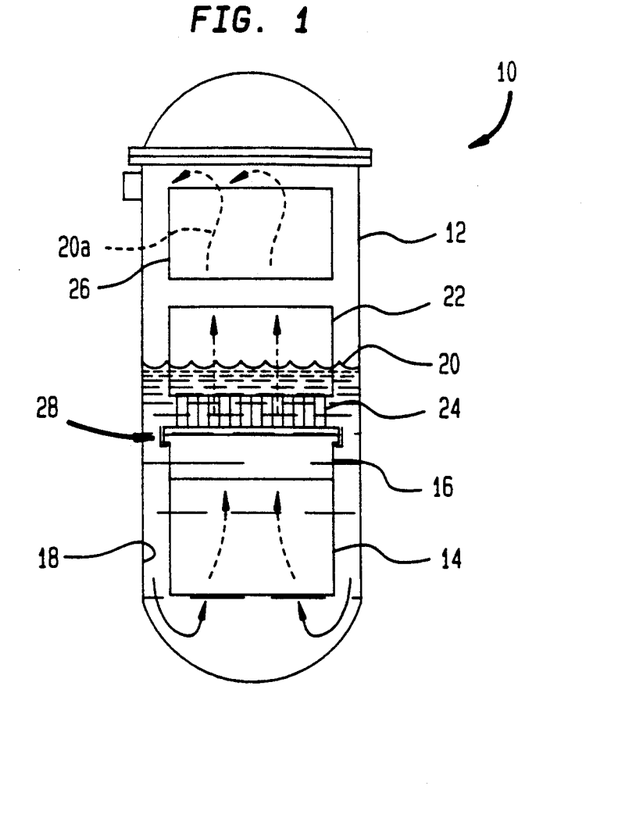
FIG. 1 is a schematic, elevational view of an exemplary nuclear reactor having a steam separator assembly joined to a shroud above a reactor core in accordance with one embodiment of the present invention.

Illustrated schematically in FIG. 1 is an exemplary boiling water reactor (BWR) 10 which includes a conventional annular pressure vessel 12 having a removable upper head or dome thereof. Disposed inside the pressure vessel 12 is a conventional nuclear reactor core 14 and extending upwardly therefrom is a tubular shroud or chimney 16. The core 14 and shroud 16 are spaced radially inwardly from the inside surface of the pressure vessel 12 to define a conventional annular downcomer 18 therebetween, and the vessel 12 is partially filled with a coolant water 20 at an elevation above the core 14 and shroud 16, with the downcomer 18 providing a recirculation flowpath downwardly to the bottom of the core 14 during operation.

The water 20 flows upwardly through the core 14 during operation and is heated thereby for generating a water-steam mixture which flows upwardly through the shroud 16. A conventional steam separator assembly 22 is disposed above the shroud 16 for receiving therefrom the water-steam mixture for the separation thereof. The separator assembly 22 includes a plurality of laterally spaced apart conventional tubular steam separators each extending upwardly from a conventional tubular standpipe 24 for individually receiving respective portions of the water-steam mixture from the shroud 16. Water is separated in the separator assembly 22 and returned into the downcomer 18 for flow downwardly to the bottom of the pressure vessel 12, and the separated steam indicated by the dashed line 20a flows upwardly in the pressure vessel 12 to a conventional steam dryer 26 which removes additional moisture therefrom prior to discharging the steam 20a from the pressure vessel 12 in a conventional manner.

Figure 2:
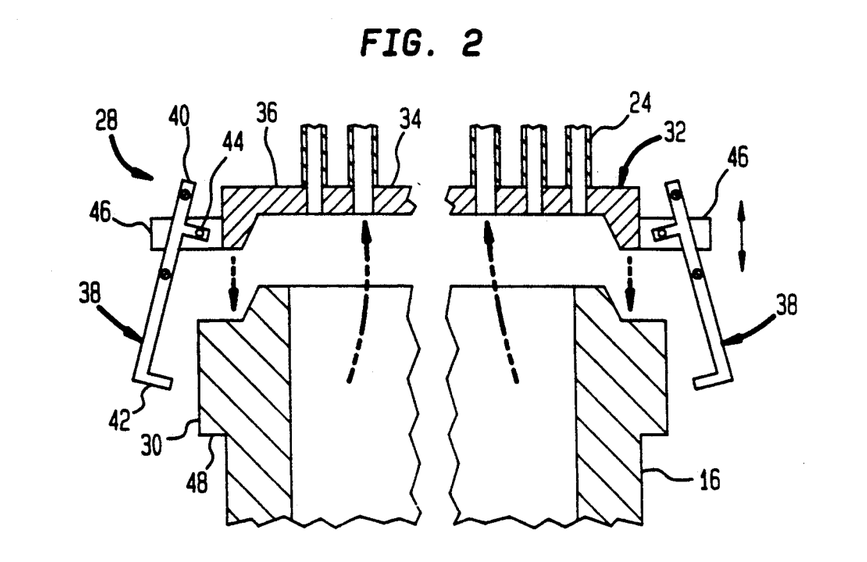
FIG. 2 is an enlarged, partly sectional, exploded, elevational view of a portion of the steam separator assembly shown in FIG. 1 illustrating a latch assembly for joining an annular head thereof to the top of a tubular shroud in accordance with a first embodiment of the present invention.

In accordance with the present invention, the steam separator assembly 22 is removably fixedly joined to the shroud 16 by a latch assembly 28 instead of using conventional bolts. The latch assembly 28 is illustrated in more particularity in FIG. 2 for joining the steam separator assembly 22 (as shown in FIG. 1) to the shroud 16. Disposed at the distal or top end of the shroud 16 is an integral annular support flange 30. An annular shroud or chimney head 32 in the form of a flat plate as shown in FIG. 2, or a dome plate not shown, includes a central portion 34 for supporting the steam separator assembly 22 thereon. More specifically, the several standpipes 24 which support the individual steam separators are suitably fixedly joined to the head 32 and disposed in flow communication therewith through respective apertures therethrough. The head 32 includes an annular head flange 36 extending around an outer perimeter thereof for supporting the head 32 on the shroud support flange 30. The bottom of the head flange 36 and the top of the support flange 30 are suitably configured for allowing the head 32 to simply rest upon the support flange 30.

A plurality of vertical latches 38 are circumferentially spaced apart around the head flange 36, with each latch 38 having a top end 40, a generally L-shaped latch hook 42 at a bottom end thereof spaced downwardly from the top end 40, and a pivot support 44 disposed at an intermediate portion between the top end 40 and the latch hook 42, to pivotally join the latch 38 to the head flange 36. As shown in FIG. 2, the head 32 includes a plurality of radially extending and circumferentially spaced apart support arms 46 disposed in pairs and between which the respective pivot supports 44 are joined in a conventional fashion such as by using a suitable pin or bolt extending through the respective latches 38 about which the latches 38 may be pivoted in the radial direction relative to the centerline axis of the shroud 16.

Figure 3:
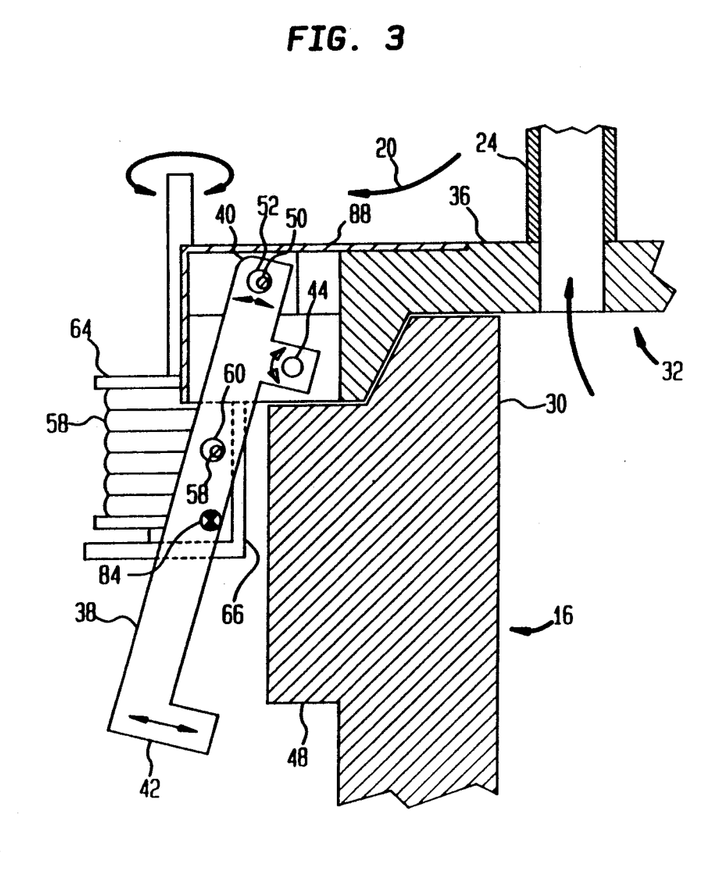
FIG. 3 is an enlarged, partly sectional view of one of the latches illustrated in FIG. 2 shown in a disengaged position relative to the shroud flange.

Means are provided for simultaneously pivoting all of the latches 38 together about their respective pivot supports 44 for selectively engaging and disengaging the latch hooks 42 with the support flange 30. As shown in exploded view in FIG. 2, each of the latch hooks 42 is generally L-shaped for engaging a complementary holddown notch 48 in the support flange 30. In FIG. 2, the head 32 including the steam separator 22 thereon is conventionally lowered on top of the shroud 16 until the mating head flange 36 rests atop the support flange 30 as illustrated in FIG. 3. The pivoting means are preferably joined in cooperation with the latch top ends 40 for displacing radially the top ends 40 to pivot the latches 38 on the pivot supports 44 for displacing radially the latch hooks 42 relative to the support flange 30. In FIG. 3, the latches 38 are shown disengaged from the support flange 30 and the double-headed arrows show movement of the latches 38. And, in FIG. 4, the latches 38 are shown engaged with the support flange 30 for retaining the head 32 thereon during operation of the reactor core 14.

Figure 4:
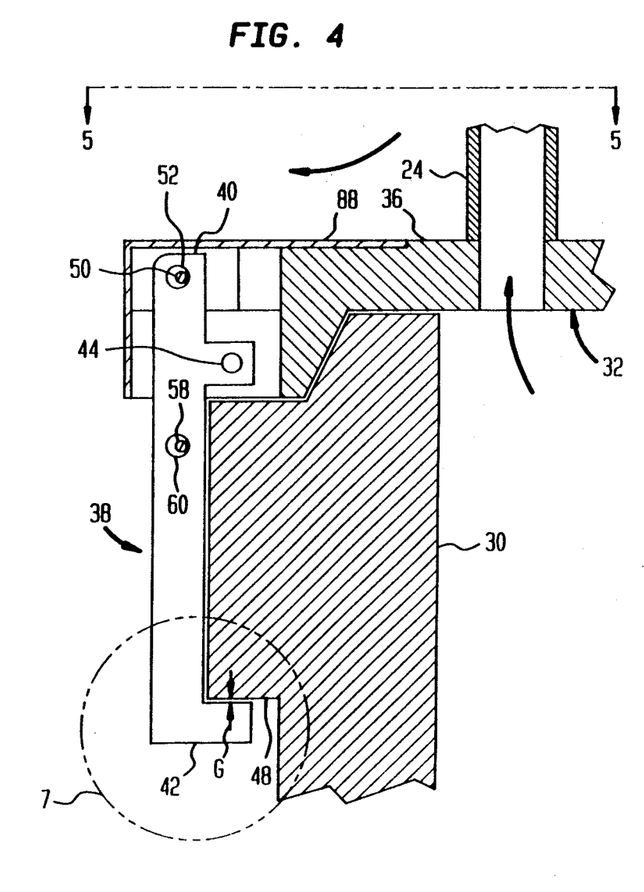
FIG. 4 is an enlarged, partly sectional view of one of the latches illustrated in FIG. 2 shown in an engaged position relative to the shroud flange.
Figure 5:
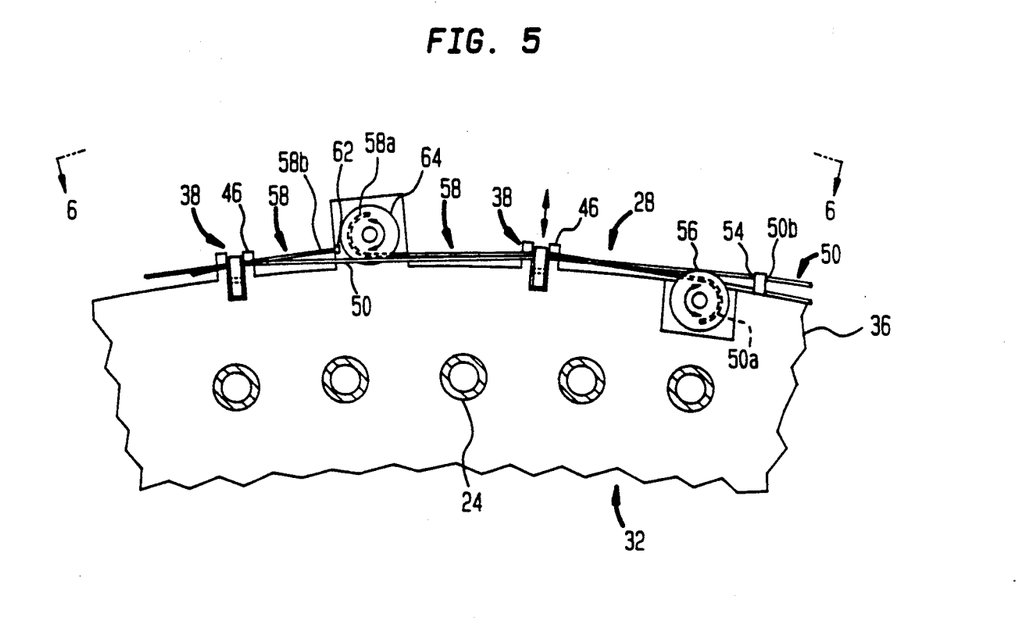
FIG. 5 is a top view of a portion of the annular head and exemplary latches shown in FIG. 4 and taken along line 5—5.
Figure 6:
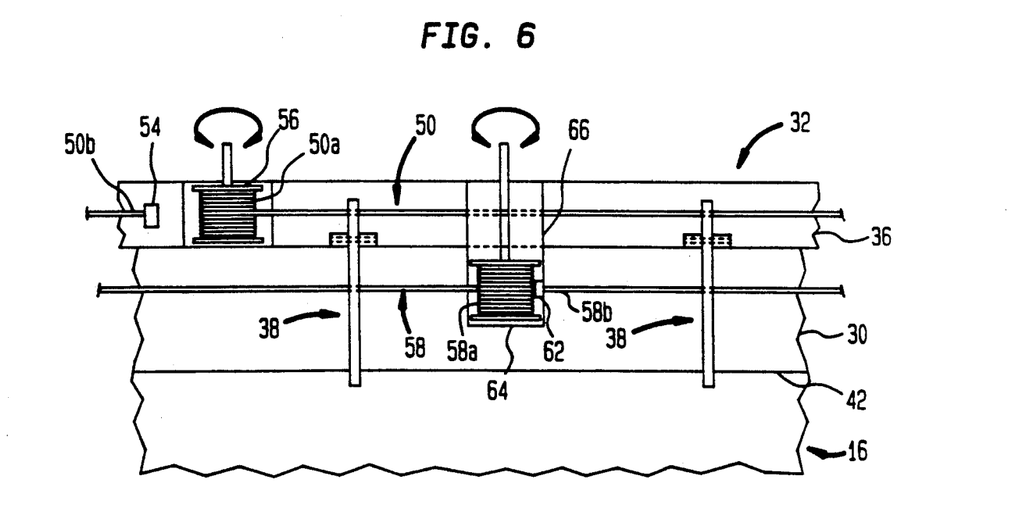
FIG. 6 is an elevational view of a portion of the latch assembly illustrated in FIG. 5 and taken along line 6—6.

The pivoting means are illustrated in more particularity in FIGS. 5 and 6 and are preferably fixedly joined to the head 32 for movement therewith as the head 32 is assembled to and disassembled from the shroud 16. In this way, the entire latch assembly 28 is removable with the head 32 and the steam separator assembly 22 thereon. As shown in FIGS. 3-6, the pivoting means are shown in a first embodiment and include a first cable 50, which may be formed of conventional stainless steel wires, which extends circumferentially around the head flange 36 and slidingly through top holes 52 disposed in respective ones of the latch top ends 40. The first cable 50 as shown in FIGS. 5 and 6 has a distal end 50a and an opposite proximal end 50b, with the proximal end 50b being fixedly joined to the head flange 36 at a suitable support block 54, for example. A first tensioning device or spool 56 is joined to the top of the head flange 36 and is fixedly joined to the first cable distal end 50a. As shown in FIGS. 5 and 6, the first spool 56 may be rotated either manually or by a suitable power device selectively in a first direction, clockwise as illustrated in FIG. 5, for suitably tensioning the first cable 50 to simultaneously displace the latch top ends 40 radially inwardly, as shown by the arrows in FIGS. 3 and 5, for pivoting the latches 38 to displace the latch hooks 42 radially outwardly for disengagement with the support flange notches 48 as shown in FIG. 3. The first spool 56 is also rotatable in a second, opposite direction, counterclockwise as illustrated in FIG. 5, to loosen the first cable 50 for allowing the latches 38 to pivot to engage the latch hooks 42 with the support flange notches 48 as illustrated in FIG. 4.

The latch hooks 42 may be caused to engage the notches 48 in many manners. For example, and referring to FIGS. 3-6, the pivoting means preferably also include a second cable 58, which like the first cable 50 may be also formed of stainless steel wires, which extends circumferentially around the latches 38 and slidingly through bottom holes 60 disposed in respective ones of the latches 38 between the pivot supports 44 and the latch hooks 42. The second cable 58 also has a distal end 58a and an opposite proximal end 58b, with the proximal end 58b being fixedly joined to the head flange 36 at a suitable support block 62 as shown in FIGS. 5 and 6.

As shown in FIGS. 3, 5, and 6, a second tensioning device or spool 64 is joined to the head flange 36, and is fixedly joined to the second cable distal end 58a. As shown in FIGS. 3 and 6, the second spool 64 is suitably joined to a support plate 66 hanging vertically from the outer perimeter of the head 32 for being removable with the head 32 during disassembly. The second spool 64 is selectively rotatable in a first direction, counterclockwise as illustrated in FIG. 5, for loosening the second cable 58 to allow the first cable 50 to be tensioned by rotation of the first spool 56 for allowing the latches 38 to pivot to disengage the latch hooks 42 radially outwardly from the support flange notches 48 as shown in FIG. 3. And, the second spool 64 is also rotatable in an opposite second direction, clockwise as illustrated in FIG. 5, for tensioning the second cable 58 to simultaneously displace the latch hooks 42 radially inwardly to engage with the support flange notches 48 and to pivot the latches 38 for displacing the latch top ends 40 radially outwardly after the first cable 50 is loosened as illustrated in FIG. 4. Both first and second spools 56, 64 preferably include conventional ratchet and pawls to maintain tension in the cables 50, 58 when required.

Accordingly, the first and second cables 50 and 58 may be selectively tightened and loosened for either pivoting the latches 38 outwardly as illustrated in FIG. 3 to disengage the latch hooks 42 from the support flange notches 48 which will then allow the entire head 32 to be lifted upwardly from the support flange 30, or rotated inwardly for engaging the latch hooks 42 with the notches 48 for securing the head 32 to the support flange 30. The cables 50, 58 allow the simultaneous engagement and disengagement of the latches 38 and the support flange 30 by corresponding tightening and loosening thereof by the respective spools 56, 64. In this way, engagement and disengagement of the head 32 to the support shroud 30 may be more quickly accomplished during a maintenance outrage without the need for individually installing and removing conventional bolts for joining the head 32 to the support flange 30.

In an alternate embodiment (not shown) a single spool having the first and second cables 50, 58 wrapped thereon in opposite directions could be used instead of the two spools 56, 64.

In the preferred embodiment of the present invention, the latches 38 themselves may be made of a material having a coefficient of thermal expansion which is less than that of the support flange 30, with the engaged latch hooks 42 providing an initial, or cold, vertical gap G as illustrated in FIG. 4 relative to the support notch 48. As the several components are heated during power-up of the reactor core 44 to normal operating temperature, the difference in thermal expansion between the latches 38 and the support flange 30 will cause the gap G to reduce to zero, and further provide an interference fit to securely attach the head 32 to the support flange 30. The differential expansion of the latches 38 and the support flange 30 will elastically stretch the latches 38 to ensure a tight fit of the head flange 36 to the support flange 30. For example, the support flange 30 may be formed of conventional austenitic stainless steel such as 304 or 316, and the latches 38 may be formed from conventional Inconel 600, or 410/416 Martensitic stainless steel, or 17-4 precipitation hardened (PH) stainless steel for providing effective differences in the coefficients of thermal expansion thereof.

Figure 7:
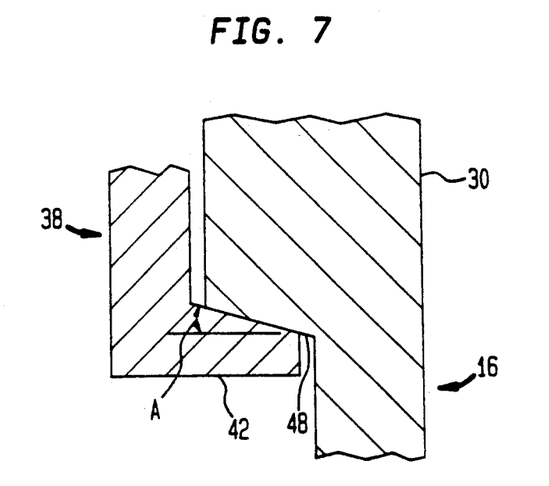
FIG. 7 is an enlarged, elevational view of a latch hook of one of the latches illustrated in FIG. 4 within the circle labeled 7 showing an alternate embodiment thereof.

In an alternate embodiment as illustrated in FIG. 7, the latch hooks 42 and the support flange notches 48 are configured to initially engage each other in abutting contact at an acute horizontal angle A extending radially outwardly and upwardly relative to the shroud 16. In this way, upon initial engagement of the latch hooks 42 with the support flange notches 48, contact will occur therebetween without the use of the vertical gap G in the embodiment illustrated in FIG. 4. In the embodiment illustrated in FIG. 7, the coefficient of thermal expansion of the latches 38 is preferably less than that of the support flange 30 to stretch the latches 38 vertically during heating of the reactor to operating temperature. Alternatively, the latches 38 may be formed of the same material as the support flange 30 having the same coefficient of thermal expansion. The angle A is preferably relatively small, for example less than about 15°, to ensure initial engagement between the latch hook 42 and the notch 48 and to ensure a friction interference fit therebetween at normal operating temperature.

Figure 8:
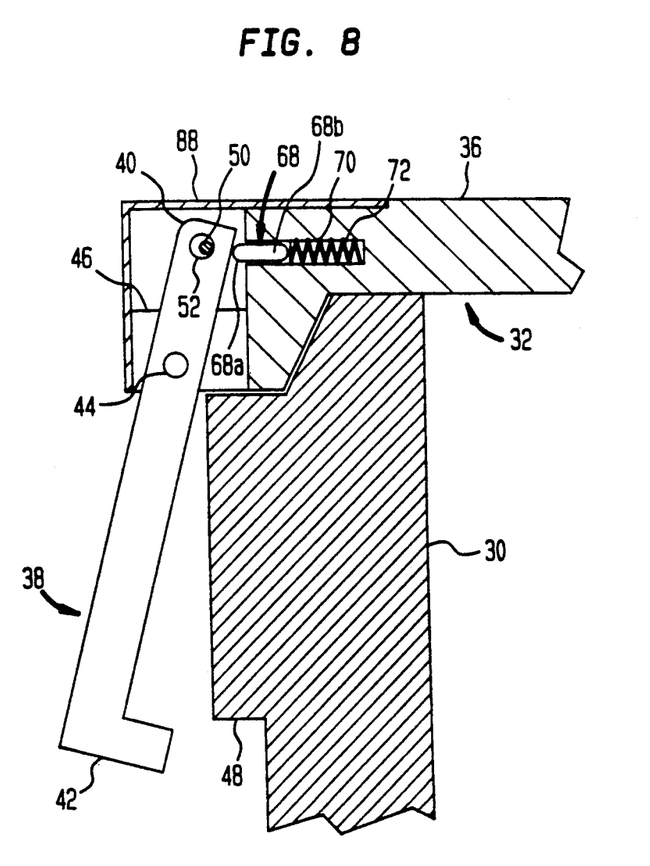
FIG. 8 is a schematic, elevational, partly sectional view of a latch assembly in accordance with a second embodiment of the present invention.

Illustrated schematically in FIG. 8 is the latch assembly 28 in accordance with a second embodiment of the present invention. In this embodiment which is similar to the first embodiment described above, instead of using the second cable 58 and its tensioning spool 64, a plurality of circumferentially spaced apart pin-shaped lifters or followers 68 are provided around the perimeter of the head flange 36 and extend radially outwardly in respective bores 70 formed in the head flange 36.

Each lifter 68 has a semi-spherical distal end 68a disposed in sliding contact with a respective one of the latch top ends 40 adjacent the top hole 52, and a proximal end 68b disposed in a respective one of the bores 70. A plurality of compression springs 72 are provided, with each spring 72 being disposed in a respective one of the bores 70 and against the lifter proximal end 68b for pushing the lifter 68 against the latch top end 40 to displace the latch top end 40 radially outwardly as the first cable 50 is loosened.

Accordingly, in order to disengage the latch hook 42 from the notch 48, the first spool 56 tightens the first cable 50 which draws the latch top ends 40 radially inwardly against the lifters 68 for further compressing the springs 72 within the bores 70. In order to engage the latch hooks 42 with the notches 48, the first spool 56 loosens the first cable 50, with the compression springs 72 pushing the lifters 68 radially outwardly against the latch top ends 40 for pivoting the latch hooks 42 radially inwardly into engagement with the notches 48.

Figure 9:
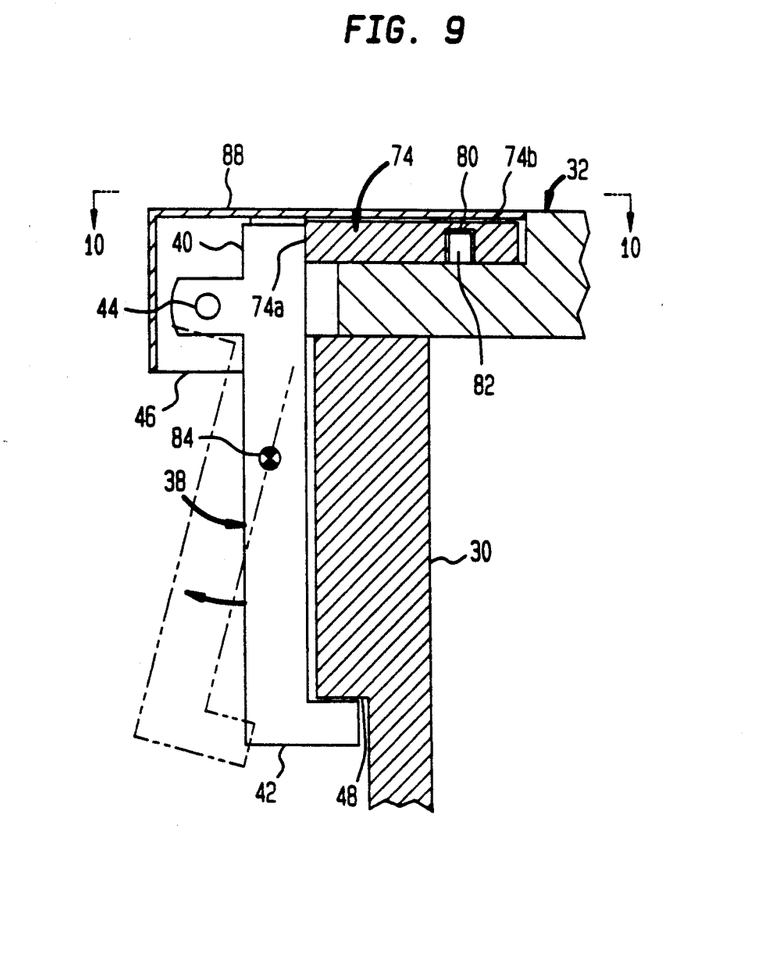
FIG. 9 is a schematic, elevational, partly sectional view of a latch assembly in accordance with a third embodiment of the present invention.
Figure 10:
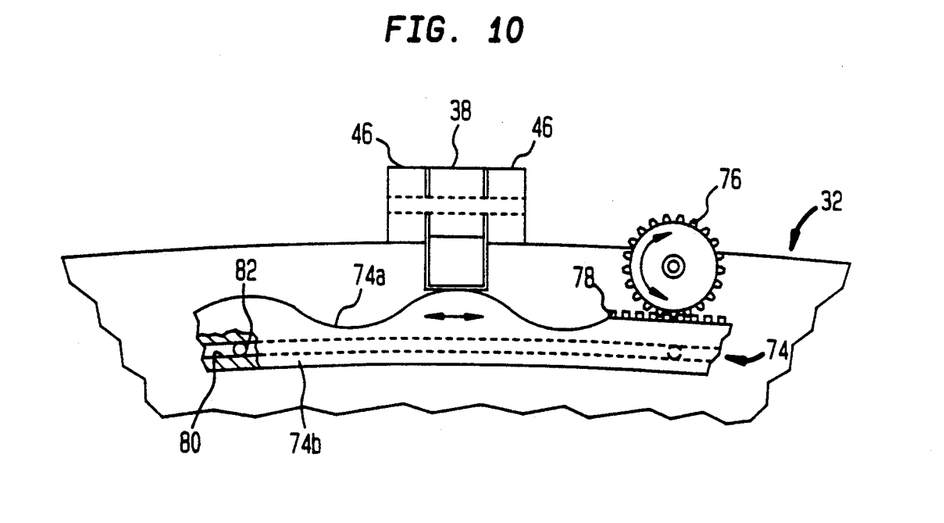
FIG. 10 is a top view of a portion of the latch assembly illustrated in FIG. 9 and taken along line 10—10.

Illustrated in FIGS. 9 and 10 is a third embodiment of the present invention which does not use either the first or second cables 50, 58. Instead, the pivoting means include an annular, ring-like first cam plate 74 disposed on the top surface of the head 32 and having an undulating radially outwardly facing distal end 74a which provides a cam surface joined in cam sliding contact with at least one of the latch top ends 40 and preferably all of the latch top ends 40 in the preferred embodiment. The cam plate 74 also includes a proximal end 74b facing radially inwardly which is slidingly joined to the head 32 for coaxial rotation therearound. Suitable means in the exemplary form of a conventional manual or powered pinion gear 76 and rack gear 78 are provided for moving the cam plate 74 coaxially around the head 32 for displacing the latch top end 40 to pivot the latch 38.

In the exemplary embodiment illustrated in FIGS. 9 and 10, the proximal end 74b includes a downwardly facing and circumferentially extending slot 80 in which are positioned a plurality of circumferentially spaced apart pins 82 extending vertically upwardly. As shown by the double headed circumferentially extending arrow in FIG. 10, the cam plate 74 is rotatably either clockwise or counterclockwise upon rotation of the pinion gear 76 which in turn moves the rack gear 78 extending from the cam plate 74. As the cam plate 74 rotates, the top ends 40 of the several latches 38 are caused to move radially outwardly upon contact with the high lobes of the cam plate 74 to engage the latch hooks 42 with the notches 48. When the low lobes of the cam plate 74 are aligned with the respective latch top ends 40, the latches 38 are allowed to disengage the latch hooks 42 from the notches 48, by gravity for example in the exemplary embodiment illustrated in FIG. 9. As shown, each of the latches 38 includes a center of gravity 84 which is disposed radially between the latch hook 42 and the pivot support 44 so that when the low lobe of the cam plate 74 is aligned with the latch top end 40, gravity will pivot the latches in a clockwise direction as illustrated in FIG. 9 to disengage them from the support flange 30.

Although an individual cam plate 74 could be provided for each of the latches 38, the cam plate 74 illustrated in FIGS. 9 and 10 is fully annular, with the distal end 74a thereof simultaneously contacting all the top ends 40 of the several latches 38 for uniformly pivoting the latches 38. In the exemplary embodiment illustrated in FIGS. 9 and 10, the cam plate distal end 74a is disposed on the radially outer perimeter of the cam plate 74, with the high lobes pushing the latch top ends 40 radially outwardly as the cam plate 74 is moved or rotated either clockwise or counterclockwise. The centers of gravity 84 of the latches 38 are preferably also disposed radially between the pivot support 44 and the cam plate 74 for allowing gravity to pivot the latches 38 as the cam plate distal end 74a moves radially inwardly to displace the latch hooks 42 radially outwardly to disengage from the support flange 30.

Figure 11:
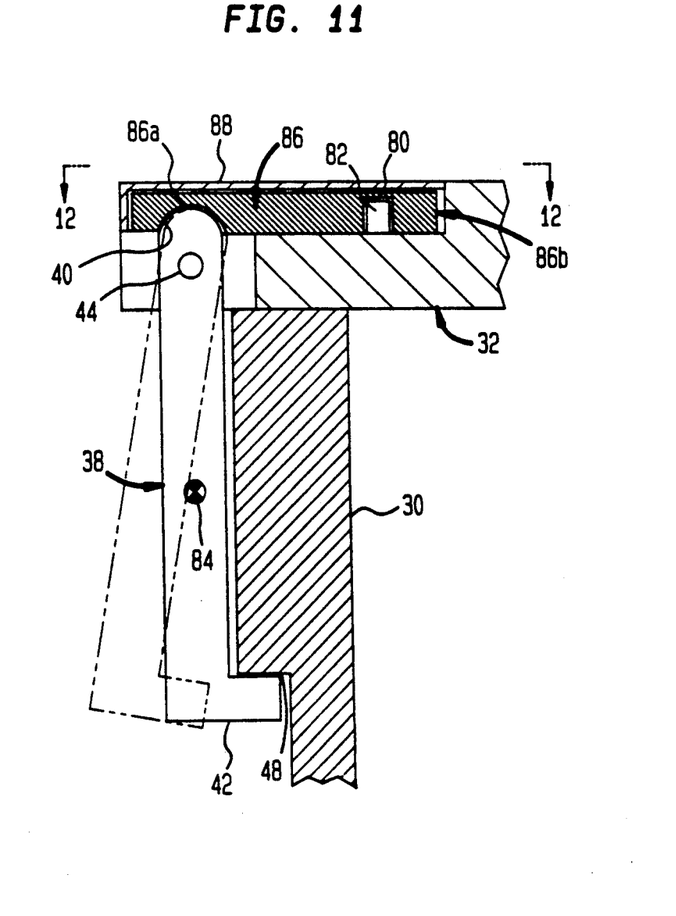
FIG. 11 is a schematic, elevational, partly sectional view of a latch assembly in accordance with a fourth embodiment of the present invention.
Figure 12:
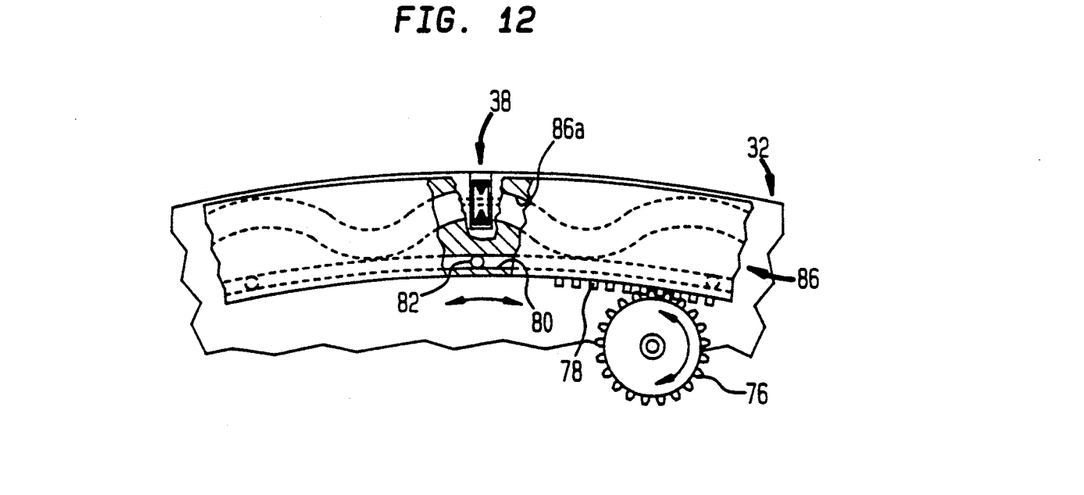
FIG. 12 is a top view of a portion of the latch assembly illustrated in FIG. 11 and taken along line 12—12.

Illustrated in FIGS. 11 and 12 is a fourth embodiment of the present invention which uses a second cam plate 86 which is generally similar to the first cam plate 74 disclosed above which is annular and rotatable either clockwise or counterclockwise by the rack and pinion 78, 76.

In this embodiment, however, the latch top ends 40 are arcuate and the cam plate 86 includes a distal end 86a in the form of an undulating, complementary arcuate groove facing downwardly and disposed in sliding contact with the arcuate latch top ends 40. The cam plate 86 also includes a proximal end 86b similarly including a circumferentially extending slot 80 in which a plurality of the pins 82 extend vertically upwardly from the head 32. As the pinion gear 76 selectively rotates the second cam plate 86 either clockwise or counterclockwise, the distal end groove 86a pushes the latch top ends 40 radially outwardly to engage the latch hooks 42 with the support flange 30, and radially inwardly to disengage the latch hooks 42 from the support flange 30. Accordingly, the cam plate 86 positively rotates the several latches 38 simultaneously either radially outwardly to disengage the latch hooks 42 or radially inwardly to engage the latch hooks 42 with the support flange 30.

Since the several embodiments of the latch assembly 28 described above are located below the steam separator assembly 22 as illustrated in FIG. 1, water separated from the water-steam mixture in the separator assembly 22 flows downwardly into the downcomer 18 and over the latch assembly 28. Accordingly, a suitable fairing 88 as illustrated in FIG. 3, for example, may be disposed vertically above the latches 38 for channeling the water discharged from the steam separator assembly 22 over the latches 38 and downwardly along the shroud 16 to reduce pressure losses from flow of the water over the latches 38 themselves. The fairing also protects the latches 38 from flow induced vibration for example.

In the embodiment of the latches 38 illustrated in FIG. 9, the center of gravity 84 is disposed between the pivot support 44 and the cam plate 74 to allow gravity to pivot the latch 38 about the pivot support 44 to disengage the latch hook 42. In an alternate embodiment illustrated in FIG. 3, the center of gravity 84 of the latch 38 is disposed radially outwardly from the pivot support 44 to allow gravity to pivot the latch 38 into engagement with the support flange 30. And, in FIG. 11, the center of gravity 84 is disposed generally along the longitudinal axis of the latch 38 which does not provide either self-engaging or self-disengaging of the latch 38 with the support flange 30.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims;

We claim:

1. A latch assembly for removably joining a steam separator assembly to an annular support flange disposed at a distal end of a tubular shroud in a pressure vessel of a nuclear reactor comprising:

an annular head having a central portion for supporting said steam separator assembly thereon, and an annular head flange extending around a perimeter thereof for supporting said head on said support flange;

a plurality of latches circumferentially spaced apart around said head flange, each having a top end, a latch hook at a bottom end thereof, and a pivot support disposed at an intermediate portion therebetween pivotally joining said latch to said head flange; and means for pivoting said latches about said pivot supports for selectively engaging and disengaging said latch hooks with said support flange.

2. An assembly according to claim 1 wherein each of said latch hooks is generally L-shaped for engaging a complementary notch in said support flange.

3. An assembly according to claim 2 wherein said pivoting means are joined in cooperation with said latch top ends for displacing said top ends to pivot said latches on said pivot supports for displacing said latch hooks relative to said support flange.

4. An assembly according to claim 3 wherein said pivoting means are joined to said head for movement therewith as said head is assembled to and disassembled from said shroud.

5. An assembly according to claim 4 wherein said pivoting means comprise:

a first cable extending circumferentially around said head flange and slidingly through top holes disposed in respective ones of said latch top ends, said first cable having a distal end and an opposite proximal end, said first cable proximal end being fixedly joined to said head flange; and a first tensioning spool joined to said head flange, and fixedly joined to said first cable distal end, said first spool being selectively rotatable in a first direction for tensioning said first cable to simultaneously displace said latch top ends radially inwardly for pivoting said latches to displace said latch hooks radially outwardly for disengagement with said support flange notches, and rotatable in an opposite second direction to loosen said first cable for allowing said latches to pivot to engage said latch hooks with said support flange notches.

6. An assembly according to claim 5 wherein said pivoting means further comprise:

a second cable extending circumferentially around said latches and slidingly through bottom holes disposed in respective ones of said latches between said pivot supports and said latch hooks, said second cable having a distal end and an opposite proximal end, said second cable proximal end being fixedly joined to said head flange; and a second tensioning spool joined to said head flange, and fixedly joined to said second cable distal end, said second spool being selectively rotatable in a first direction for loosening said second cable to allow said first cable to be tensioned for allowing said latches to pivot to disengage said latch hooks radially outwardly from said support flange notches, and rotatable in an opposite second direction for tensioning said second cable to simultaneously displace said latch hooks radially inwardly to engage with said support flange notches and to pivot said latches for displacing said latch top ends radially outwardly after said first cable is loosened.

7. An assembly according to claim 5 wherein said pivoting means further comprise:
 a plurality of circumferentially spaced apart lifters extending radially outwardly in respective bores in said head flange, each lifter having a distal end disposed in sliding contact with a respective one of said latch top ends, and a proximal end disposed in a respective one of said bores; and
 a plurality of compression springs, each disposed in a respective one of said bores and against said lifter proximal end for pushing said lifter against said latch top end to displace said latch top end radially outwardly as said first cable is loosened.

8. An assembly according to claim 4 wherein said pivoting means comprise:
 a cam plate disposed on said head and having an undulating distal end joined in cam sliding contact with at least one of said latch top ends, and a proximal end slidingly joined to said head; and
 means for moving said cam plate for displacing said latch top end to pivot said latch.

9. An assembly according to claim 8 wherein said cam plate is annular with said distal end thereof simultaneously contacting all said latch top ends for uniformly pivoting said latches.

10. An assembly according to claim 9 wherein said cam plate distal end is disposed on a radially outer perimeter of said cam plate for pushing said latch top ends radially outwardly as said cam plate is moved; and said latches each have a center of gravity disposed radially between said pivot supports and said cam plate for allowing gravity to pivot said latches as said cam plate distal end moves radially inwardly to displace said latch hooks radially outwardly to disengage from said support flange.

11. An assembly according to claim 9 wherein:
said latch top ends are arcuate; and
said cam plate distal end is in the form of an undulating arcuate groove disposed in sliding contact with said arcuate latch top ends for selectively pushing said latch top ends radially outwardly to engage said latch hooks with said support flange, and radially inwardly to disengage said latch hooks from said support flange.

12. An assembly according to claim 4 wherein:
said latch hooks are spaced radially below said support flange notches to define a radial gap therebetween when engaged; and
said latches have a coefficient of thermal expansion less than that of said support flange so that heating thereof during operation of said nuclear reactor closes said gap and tensions said latches in engagement with said support flange notches.

13. An assembly according to claim 4 wherein said latch hooks and said support flange notches are configured to engage each other in abutting contact at an acute horizontal angle extending radially outwardly and upwardly relative to said shroud.

14. An assembly according to claim 4 further comprising a fairing disposed above said latches for channeling water discharged from said steam separator assembly over said latches and downwardly along said shroud.

15. An assembly according to claim 4 in combination with said shroud.

16. An apparatus according to claim 15 wherein said shroud is a chimney disposed above a reactor core for channeling upwardly therefrom steam and water.

* * * * *